US006973546B2

(12) United States Patent
Johnson

(10) Patent No.: US 6,973,546 B2
(45) Date of Patent: Dec. 6, 2005

(54) METHOD, SYSTEM, AND PROGRAM FOR MAINTAINING DATA IN DISTRIBUTED CACHES

(75) Inventor: Sandra K. Johnson, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 208 days.

(21) Appl. No.: 10/259,945

(22) Filed: Sep. 27, 2002

(65) Prior Publication Data

US 2004/0064650 A1 Apr. 1, 2004

(51) Int. Cl.[7] .............................................. G06F 12/00
(52) U.S. Cl. ...................... 711/141; 709/213; 709/214; 711/145; 711/146
(58) Field of Search ........................ 711/141, 145, 146; 709/213, 214

(56) References Cited

U.S. PATENT DOCUMENTS

| | | | | |
|---|---|---|---|---|
| 5,699,551 | A | 12/1997 | Taylor et al. | |
| 5,784,590 | A | 7/1998 | Cohen et al. | |
| 5,822,763 | A | 10/1998 | Baylor et al. | |
| 5,933,849 | A | 8/1999 | Srbljic et al. | |
| 6,047,357 | A | 4/2000 | Bannon et al. | |
| 6,154,811 | A | 11/2000 | Srbljic et al. | |
| 6,256,712 | B1 | 7/2001 | Challenger et al. | |
| 6,269,432 | B1 * | 7/2001 | Smith | 711/162 |
| 6,405,289 | B1 * | 6/2002 | Arimilli et al. | 711/145 |
| 6,721,856 | B1 * | 4/2004 | Arimilli et al. | 711/146 |

OTHER PUBLICATIONS

Gadde, S., J. Chase, and M. Rabinovich. "Reduce, Reuse, Recycle: An approach to Building Large Internet Caches."

Gadde, S. "The CRISP Web Cache." Duke Department of Computer Science: Systems & Architecture [online], Nov. 1999 [retrieved on Aug. 19, 2002]. Retrieved from the Internet: <URL: http://www.cs.duke.edu/ari/cisi/crisp/>.

Gadde, S., J. Chase, and M. Rabinovich. "A Taste of Crispy Squid" Jun. 1998. Retrieved from the Internet: <URL: http://citeseer.nj.nec.com/gadde98taste.html>.

Gadde, S., J. Chase, and M. Rabinovich. "Directory Structures for Scalable Internet Caches." Department of Computer Science, Duke University. Nov. 11, 1997. pp. 1-14.

Rabinovich, M., J. Chase, and S. Gadde. "Not All Hits Are Created Equal: Cooperative Proxy Caching Over a Wide-Area Network." Jun. 1998. Retrieved from the Internet: <URL: http://citeseer.nj.nec.com/rabinovich98not.html>. pp. 1-11.

Wessels, D. and K. Claffy. "Internet Cache Protocol (ICP), version 2." National Laboratory for Applied Network Research/UCSD [memorandum]. Sep. 1997. pp. 1-13.

(Continued)

*Primary Examiner*—Mano Padmanabhan
*Assistant Examiner*—Mehdi Namazi
(74) *Attorney, Agent, or Firm*—David W. Victor; Konrad Raynes & Victor LLP

(57) ABSTRACT

Provided are a method, system, and program for maintaining data in distributed caches. A copy of an object is maintained in at least one cache, wherein multiple caches may have different versions of the object, and wherein the objects are capable of having modifiable data units. Update information is maintained for each object maintained in each cache, wherein the update information for each object in each cache indicates the object, the cache including the object, and indicates whether each data unit in the object was modified. After receiving a modification to a target data unit in one target object in one target cache, the update information for the target object and target cache is updated to indicate that the target data unit is modified, wherein the update information for the target object in any other cache indicates that the target data unit is not modified.

35 Claims, 7 Drawing Sheets

OTHER PUBLICATIONS

Doyle, R. P., J. Chase, S. Gadde, and A.M. Vahdat. "The Trickle-Down Effect: Web Caching and Server Request Distribution." Jun. 2001. Retrieved from the Internet: <URL: http://citeseer.nj.nec.com/doyle01trickledown.html>.

Gadde, S., J. Chase, and M. Rabinovich. "Web Caching and Content Distribution: A View From the Interior." May 2000. Retrieved from the Internet: <URL: http://citeseer.nj.nec.com/gadde00web.html>.

Danzig, P. B. "The Harvest Object Cache." *Dr. Dobb's Journal*, Apr. 1996. pp. 70-74.

Ousterhout, J.K., et al. "*The Sprite Network Operating System.*" IEE Computer Society, Long Beach, CA, vol. 21, No. 2, Feb. 1, 1988, pp. 23-36.

Challenger, J., et al. "*A Scalable System for Consistently Caching Dynamic Web Data.*" INFOCOM '99. Eighteenth Annual Joint Conference of the IEEE Computer and Communications Societies. Proceedings IEEE New York, NY. Mar. 21-25, 1999, pp. 294-303.

Gadde, S., et al. "*A Taste of Crispy Squid.*" Proceedings of the Workshop on Internet Service Performance, Jun. 1998, pp. 1-8.

Satyanarayanan, M. "*A Survey of Distributed File Systems.*" Technical Report CMU-CS-89-116, Feb. 1989, pp. 1-26.

Anderson, T.E., et al. "*Serverless Network File Systems.*" ACM Transactions on Computer Systems, Association for Computing Machinery, vol. 14, No. 1. New York., NY, Feb. 1, 1996, pp. 41-79.

PCT International Search Report for International Application No. PCT/GB03/04193 filed on Sep. 26, 2003.

PCT Written Opinion for International Application No. PCT/SB03/04193, date of mailing Jul. 5, 2004, 9 pages.

P. Keleher, A. Cox and W. Zwaenepoel. "Lazy Release Consistency for Software Distributed Shared Memory," Mar. 9, 1992, 10 pages.

R. Malpani, J. Lorch and D. Berger, "Making World Wide Web Caching Servers Cooperate," 14 pages, [online] [dated Dec. 1995] Available from http://www.w3.org/Conferences/WWW4/Papers/59/.

"Squid Web Proxy Cache", [online], updated May 30, 2002, [Retrieved on Jun. 11, 2002]. Retrieved from the Internet at <URL: http://www.squid-cache.org>.

* cited by examiner

Central and Local Directory Entry for Memory Page Address

Central Directory Server Program

METHOD, SYSTEM, AND PROGRAM FOR MAINTAINING DATA IN DISTRIBUTED CACHES

BACKGROUND OF THE INVENTION

1. Field of the Invention

The present invention relates to a method, system, and program for method, system, and program for maintaining data in distributed caches.

2. Description of the Related Art

Internet users often request data from a central Internet server. One challenge Internet information providers face is the goal to maintain a timely response rate for returning information to user requests while the amount of Internet traffic and users increases at exponential rates. One solution to this need to service an increasing number of users is to maintain copies of data at different locations so user data requests are serviced from mirror servers at different geographical locations to service users most proximate to that mirror server. Other solutions involve the use of distributed caches that maintain copies of data, where a central directory is maintained to keep track of data at the distributed cache servers. The cache servers can be deployed at different points in an organization to service particular groups of client users. The central directory provides mapping to maintain information on the objects within the cache servers.

The Caching and Replication Internet Service Performance (CRISP) project has developed an Internet caching service utilizing distributed proxy caches structured as a collection of autonomous proxy servers that share their contents through a mapping service.

Notwithstanding the current uses of distributed caches to service client Web access requests, there is a continued need in the art to provide further improved techniques for servicing client network requests, such as Internet Web requests.

SUMMARY OF THE DESCRIBED IMPLEMENTATIONS

Provided are a method, system, and program for maintaining data in distributed caches. A copy of an object is maintained in at least one cache, wherein multiple caches may have different versions of the object, and wherein the objects are capable of having modifiable data units. Update information is maintained for each object maintained in each cache, wherein the update information for each object in each cache indicates the object, the cache including the object, and indicates whether each data unit in the object was modified. After receiving a modification to a target data unit in one target object in one target cache, the update information for the target object and target cache is updated to indicate that the target data unit is modified, wherein the update information for the target object in any other cache indicates that the target data unit is not modified.

In further implementations, after receiving the request to modify the data unit and if the update information for the target object and target cache indicate that the target data unit is modified, the received modification is applied to the data unit in the target object in the target cache.

Still further, after receiving the modification and if the update information for the target object and target cache indicate that the target data unit is not modified, a determination may be made as to whether another cache includes the target object and a most recent target data unit value. If another cache does not include the most recent target data unit value, then the modification is applied to the data unit in the target object in the target cache and the update information for the target object and target cache is updated to indicate that the target data unit is modified, wherein the update information for the target object in any other cache indicates that the data unit is not modified.

In yet further implementations, after receiving the modification and if the update information for the target object and target cache indicate that the target data unit is not modified, then a determination is made as to whether another cache includes the target object and a most recent target data unit value. If another cache includes the most recent target data unit value, then the most recent target data unit value is retrieved from the determined cache and the target object in the target cache is updated with the retrieved most recent target data unit value.

Still further, invalidation information may be maintained for each object in each cache, wherein the invalidation information for one object in one cache indicates whether each data unit in the object is valid or invalid.

Described implementations provide techniques for managing the distributed storage of data objects in a plurality of distributed caches in a manner that avoids any inconsistent data operations from being performed with respect to the data maintained in the distributed caches.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
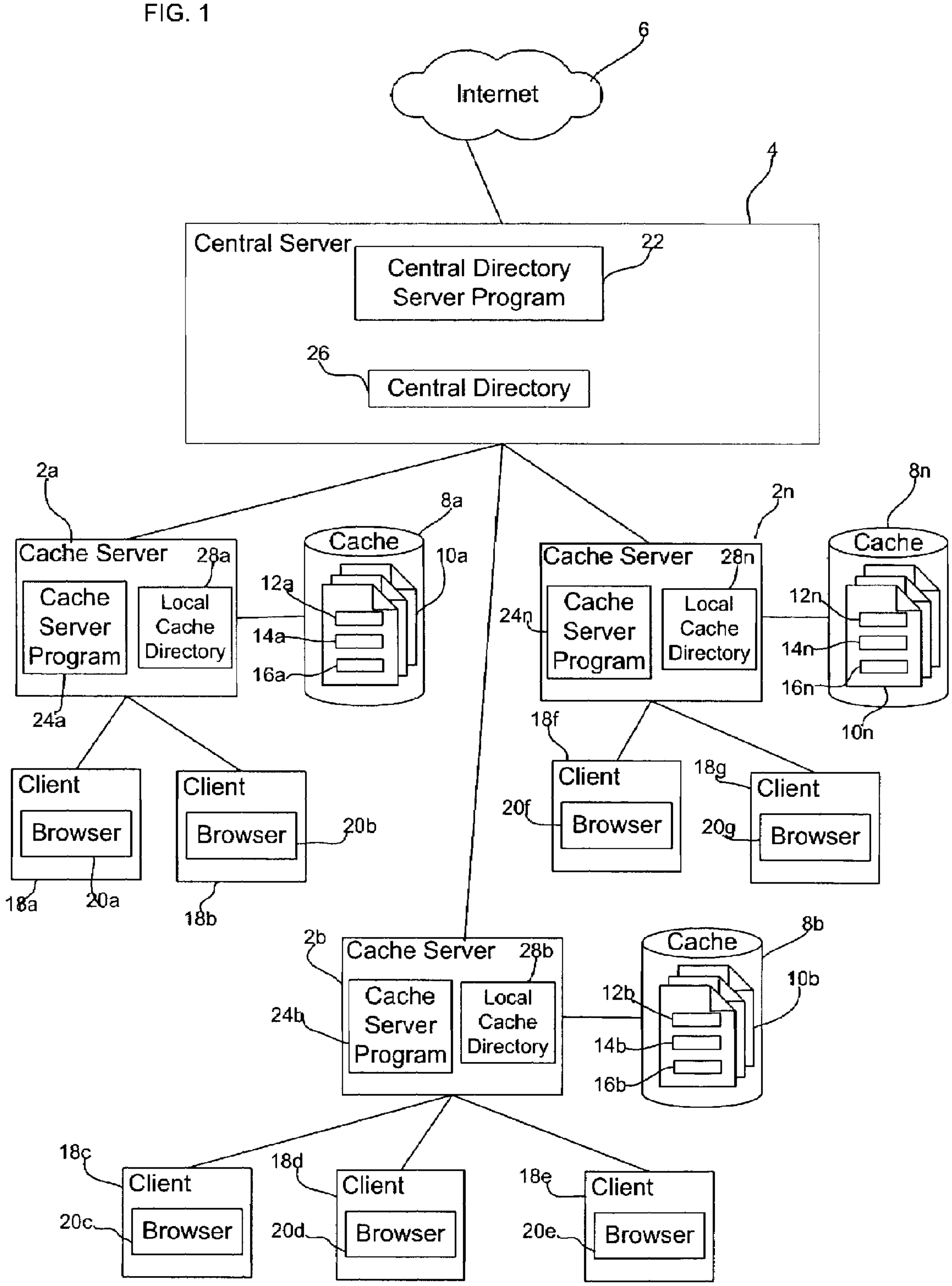
FIG. 1 illustrates a distributed network computing environment in which aspects of the invention are implemented.

FIG. 1 illustrates a network computing environment in which aspects of the invention may be implemented. A plurality of cache servers 2*a*, 2*b* . . . 2*n* connect to a central server 4, where the central server 4 is connected to the Internet 6, or any other type of network known in the art. The cache and central servers 2*a*, 2*b* . . . 2*n* may comprise any type of computing device known in the art, including server class machines, workstations, personal computers, etc. The cache servers 2*a*, 2*b* . . . 2*n* are each coupled to a cache 8*a*, 8*b* . . . 8*n* which store as memory pages 10*a*, 10*b* . . . 10*n* web pages downloaded from over the Internet 6. Each of the memory pages 10*a*, 10*b* . . . 10*n* may include objects or components, referred to herein as data units 12*a*, 12*b* . . .

12*n,* 14*a,* 14*b* . . . 14*n,* and 16*a,* 16*b* . . . 16*n,* where the data units may be modified. The data units may comprise any degree of granularity within the memory pages 10*a,* 10*b* . . . 10*n,* including a word, a field, a line, a frame, the entire page, a paragraph, an object, etc. Although FIG. 1 shows each cache 8*a,* 8*b* . . . 8*n* as including a same number of pages, where each page has a same number of data units, in described implementations, each cache 8*a,* 8*b* . . . 8*n* may maintain a different number of memory pages and different memory pages, where each memory page may have a different number of data units. The memory pages in the different caches 8*a,* 8*b* . . . 8*n* may represent web pages downloaded from different Internet web servers at different Internet addresses, e.g., Universal Resource Locators (URL), etc. The memory pages may store web pages in the same file format or in different file formats. The memory pages may include content in any media file format known in the art, such as Hypertext Language Markup (HTML), Extensible Markup Language (XML), a text file, move file, picture file, sound file, etc.

A plurality of client systems 18*a,* 18*b,* 18*c,* 18*d,* 18*e,* 18*f,* 18*g* include browsers 20*a,* 20*b,* 20*c,* 20*d,* 20*e,* 20*f,* 20*g* that communicate requests for web pages to a designated cache server 2*a,* 2*b* . . . 2*n,* such that the client requests may be serviced from the caches 8*a,* 8*b* . . . 8*n.* The client systems 18*a,* 18*b* . . . 18*g* may comprise any computing device known in the art, such as as a personal computer, laptop computer, workstation, mainframe, telephony device, hand-held computer, server, network appliance, etc., and the browser 20*a,* 20*b* . . . 20*g* may comprise any program capable of requesting files over a network, such as an Internet browser program, movie player, sound player, etc., and rendering the data from such files to the user in any media format known in the art. In certain implementations, a user at the browsers 20*a,* 20*b* . . . 20*g* may modify or update data in the data units in the memory pages in the caches 8*a,* 8*b* . . . 8*n.*

The central server 4 includes a central server directory program 22 and the cache servers 2*a,* 2*b* . . . 2*n* each include a cache server program 24*a,* 24*b* . . . 24*n* to perform caching related operations. The central server directory program 22 maintains a central directory 26 maintaining information on the data units that may be updated in each memory page in each cache 8*a,* 8*b* . . . 8*n.* Each cache server program 24*a,* 24*b* . . . 24*n* also maintains a local cache directory 28*a,* 28*b* . . . 28*n* having entries maintaining information on the data units that may be updated in the memory pages 10*a,* 10*b* . . . 10*n* in local cache 8*a,* 8*b* . . . 8*bn.* The entries in the local cache directories 28*a,* 28*b* . . . 28*n* correspond to entries for the same memory pages in the central directory 26.

Figure 2:
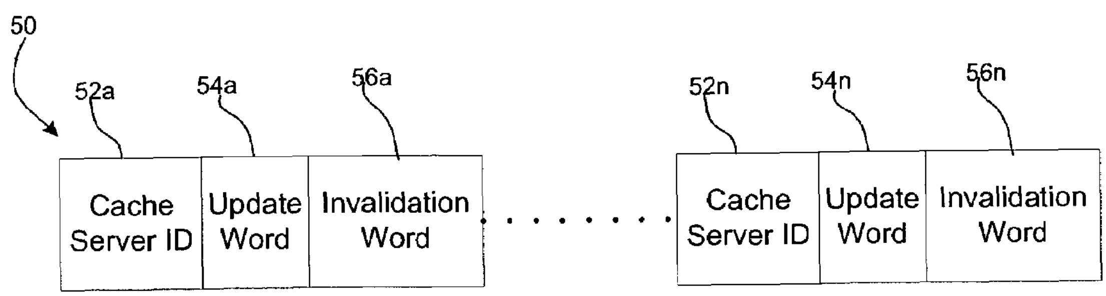
FIG. 2 illustrates data structures to maintain information on data maintained at different caches in the network computing environment.

FIG. 2 illustrates the format 50 of the entries maintained in the central directory 26 and local cache directories 28*a,* 28*b* . . . 28*n.* Each entry 50 includes one or more tuples of information for each local cache directory 28*a,* 28*b* . . . 28*n* maintaining a copy of the page corresponding to the entry in the local cache 8*a,* 8*b* . . . 8*n.* Each entry 50 corresponds to a specific memory page address, where the different caches 8*a,* 8*b* . . . 8*n* may maintain a copy of the page. Each tuple of information maintained for each cache 8*a,* 8*b* . . . 8*n* that has a copy of the page includes:

- Cache Server ID 52*a* . . . 52*n:* indicates the specific cache server 2*a,* 2*b* . . . 2*n* that includes the memory page represented by the entry. This information may be optional in the entries in the local cache directories 28*a,* 28*b* . . . 28*n.*
- Update Word 54*a* . . . 54*n:* each word has a plurality of bits, where one bit is provided for each updateable data unit in the page represented by the update word. Each bit is set "on" if the data unit in the page in the cache 8*a,* 8*b* . . . 8*n* has been modified, and set "off" if the corresponding data unit has not been modified.
- Invalidation Word 56*a* . . . 56*n:* A word of bits, where there is one bit corresponding to each memory page 10*a,* 10*b* . . . 10*n* in the caches 8*a,* 8*b* . . . 8*n.* A bit is set "on" to indicate that the data at that data unit in the memory page at the local cache 8*a,* 8*b* . . . 8*n* represented by such bit is invalid or updated, and "off" to indicate that no data unit in the memory page at the local cache 8*a,* 8*b* . . . 8*n* is updated or invalid. This word may be optional for the entries in the local cache directories 28*a,* 28*b* . . . 28*n.*

Figure 3:
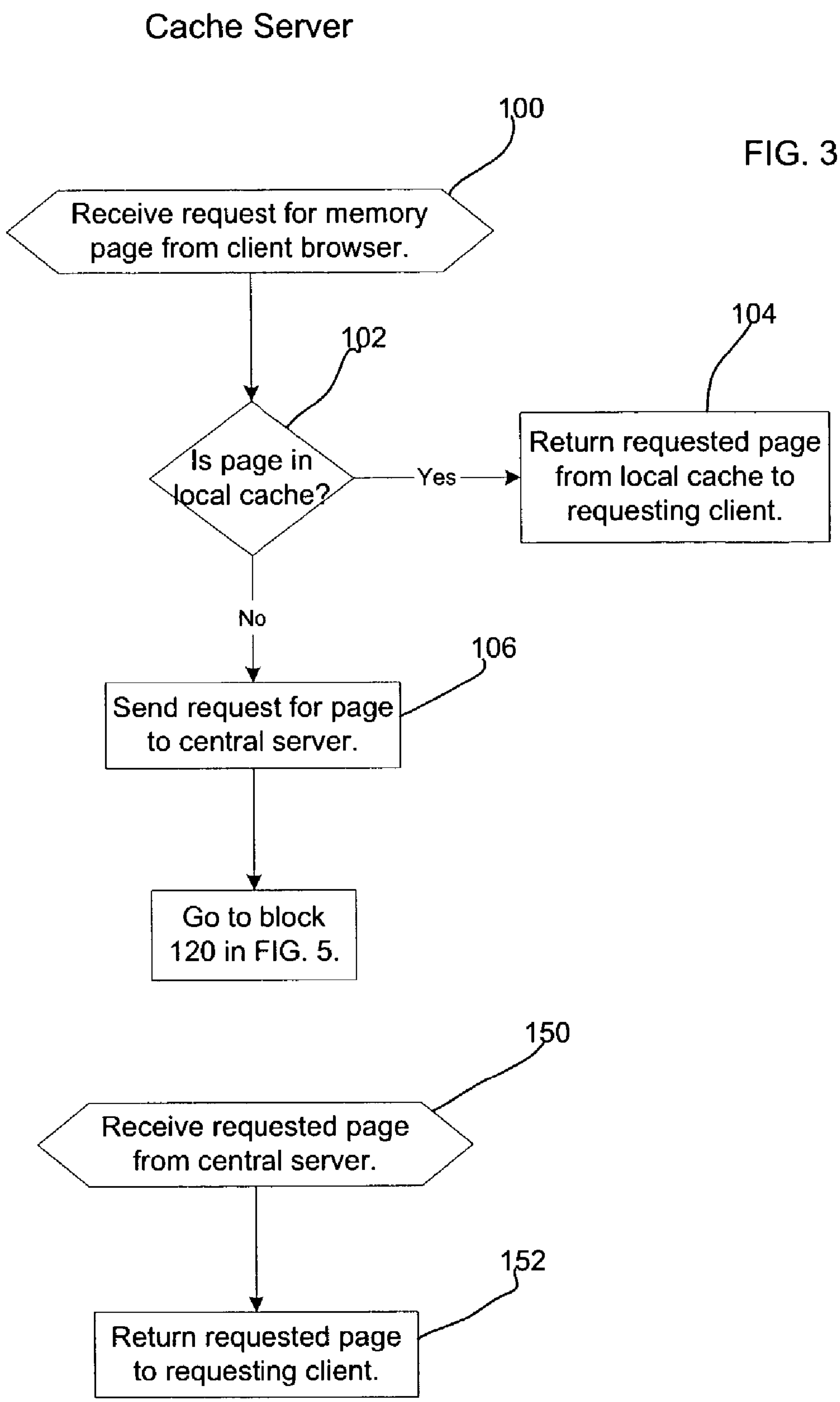
FIGS. 3 and 4 illustrate logic to process a request for an object or page in accordance with implementations of the invention.
Figure 4:
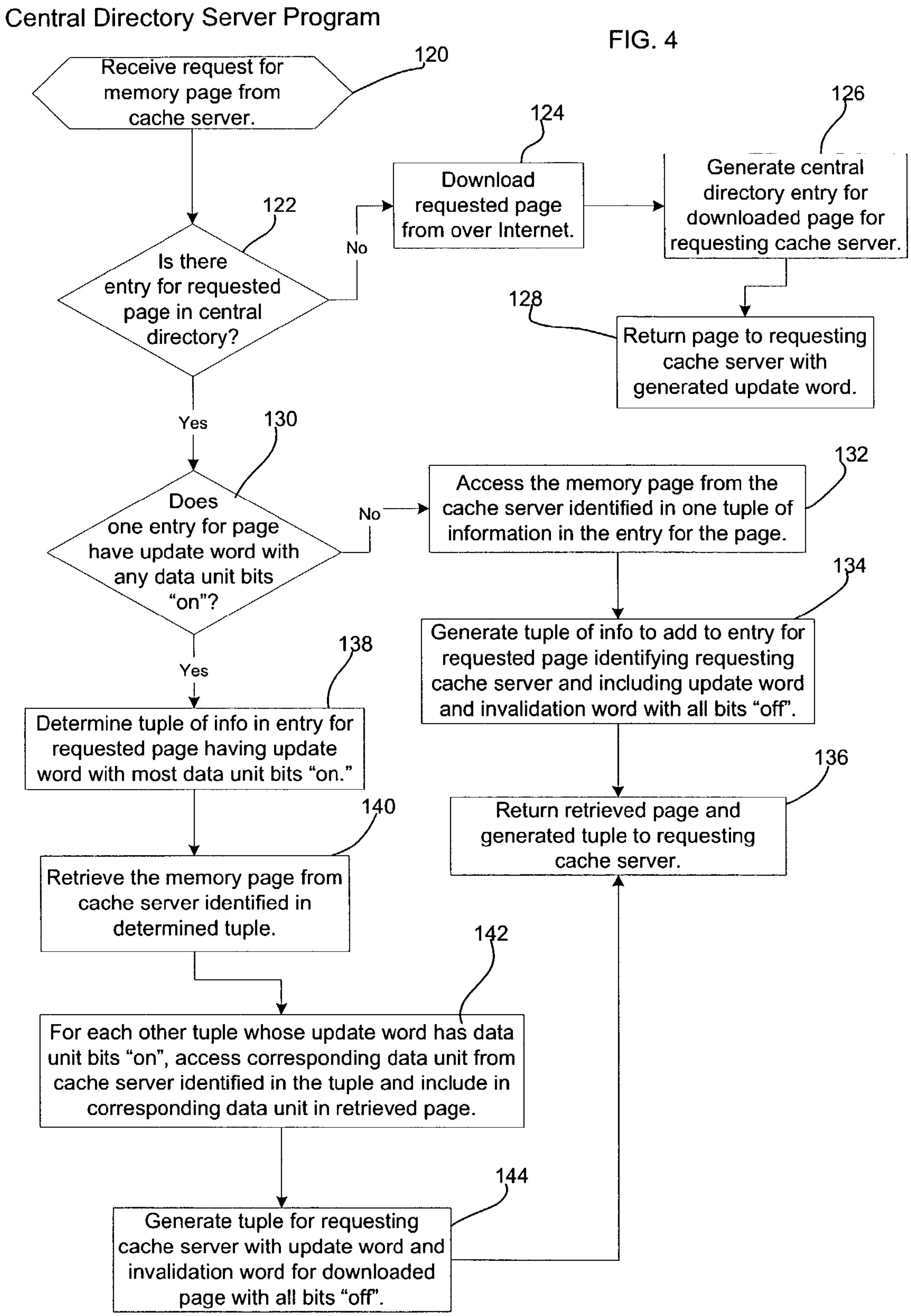
Figure 5:
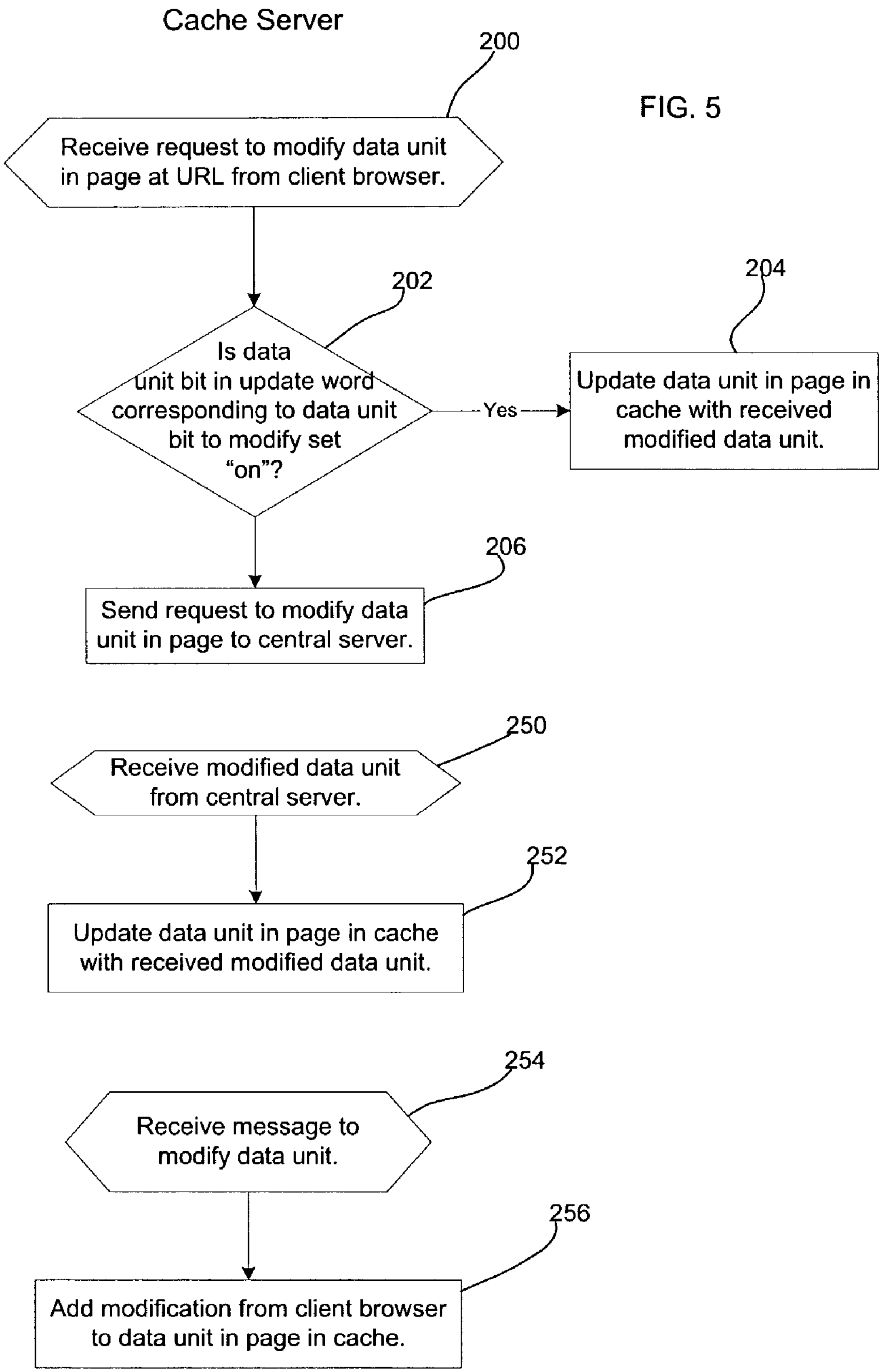
FIGS. 5 and 6 illustrate logic to process a request to modify an object in cache in accordance with implementations of the invention.
Figure 6:
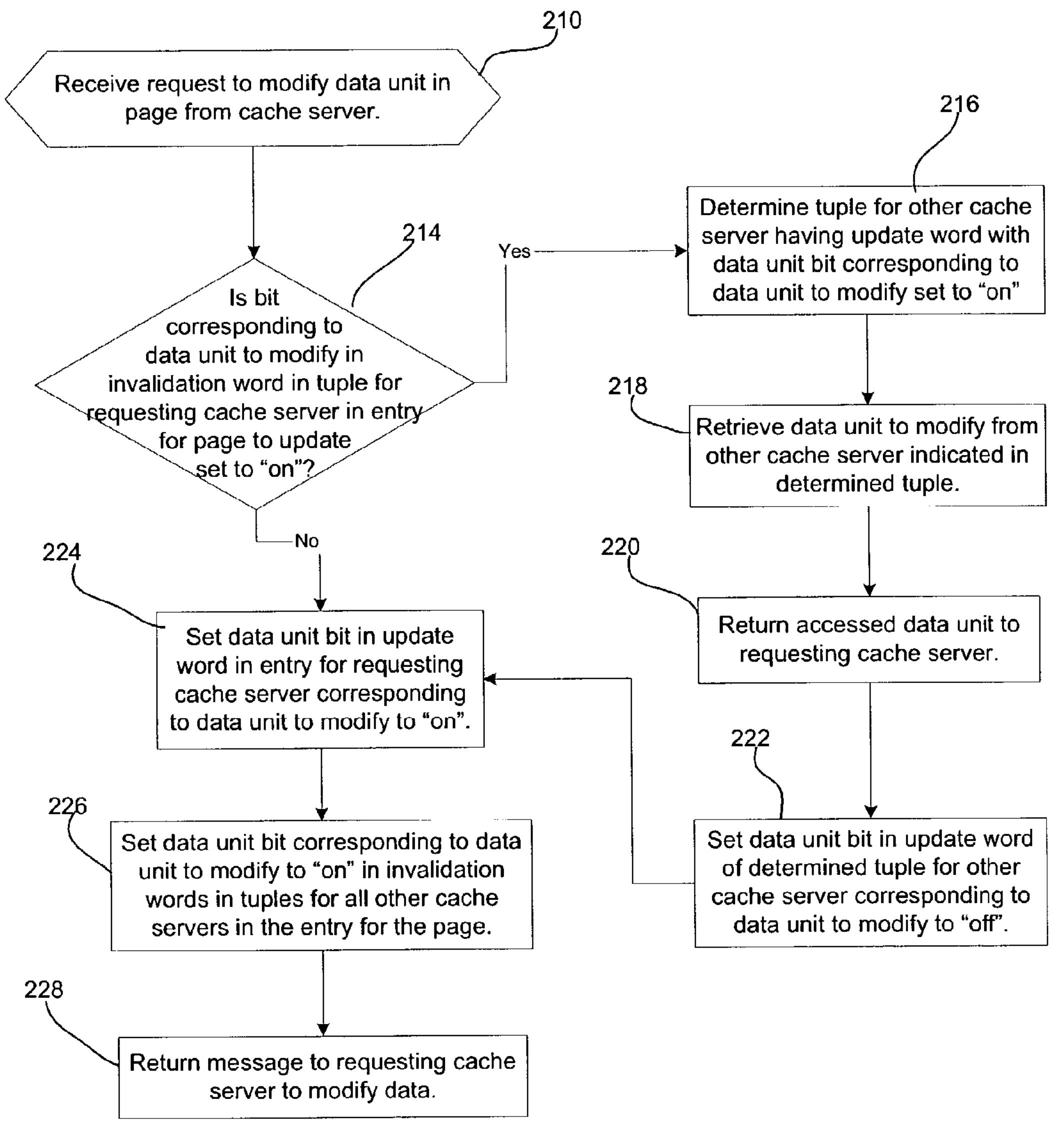

FIGS. 3 and 5 illustrate logic implemented in the cache server programs 24*a,* 24*b* . . . 24*n* and FIGS. 4 and 6 illustrates logic implemented in the central directory server program 22 to coordinate access to memory pages and data units therein to ensure that data consistency is maintained in a manner that allows the clients 18*a,* 18*b* . . . 18*g* fast access to the data.

FIGS. 3 and 4 illustrates operations performed by the cache server programs 24*a,* 24*b* . . . 24*n* and the central directory server program 22, respectively, to provide a client browser 20*a,* 20*b* . . . 20*n* read access to a memory page that is part of a requested web page. With respect to FIG. 4, control begins at block 100 with the cache server program 24*a,* 24*b* . . . 24*n* receiving a request for a memory page from one of the browsers 20*a,* 20*b* . . . 20*g.* In certain implementations, each client 18*a,* 18*b* . . . 18*g* would direct all its page requests to one designated cache server 2*a,* 2*b* . . . 2*n.* Alternatively, each client may direct requests to one of many designated alternative cache servers. In response to receiving the request, if (at block 102) the requested page is in the cache 8*a,* 8*b* . . . 8*n* coupled to the receiving cache server 2*a,* 2*b* . . . 2*n,* then the cache server program 24*a,* 24*b* . . . 24*n* returns (at block 104) the requested memory page from the cache 8*a,* 8*b* . . . 8*n.* In such implementations, the cache server program 24*a,* 24*b* . . . 24*n* provides immediate access from cache 8*a,* 8*b* . . . 8*n* to a page, however the returned page may not have the most recent copy of values for certain data units. If the requested page is not in the attached cache 8*a,* 8*b* . . . 8*n,* then the cache server program 24*a,* 24*b* . . . 24*n* sends (at block 106) a request for the requested page to the central server 4, and control proceeds to block 120 in FIG. 4 where the central directory server program 22 processes the request.

With respect to FIG. 4, in response to receiving (at block 120) a request for a memory page, the central directory server program 22 determines (at block 122) whether the central directory 26 includes an entry for the requested page. If not, then the central directory server program 22 downloads (at block 124) the requested page from over the Internet 6. An entry 50 in the central directory 26 is generated (at block 126) for the retrieved page, where the generated entry 50 identifies the cache server 2*a,* 2*b* . . . 2*n* that initiated the request in the cache server ID field 52*a* . . . 52*n,* and includes an update word 54*a* . . . 54*n* and invalidation word 56*a* . . . 56*n* with all data unit bits (FIG. 2) initially set "off". The retrieved page and the generated entry 50 are then returned (at block 128) to the requesting cache server 2*a,* 2*b* . . . 2*n* to buffer in local cache 8*a,* 8*b* . . . 8 *n* and maintain the new received entry in the local cache directory 28*a,* 28*b* . . . 28*n.*

If (at block 122) there is an entry in the central directory 26 for the requested page and if (at block 130) there is no entry whose update word 54a . . . 54n for the requested page, having data unit bits 54a . . . 54n (FIG. 2) set "on", indicating no other cache server 2a, 2b . . . 2n has updated data units 12a, 12b . . . 12n, 14a, 14b . . . 14 n, and 16a, 16b . . . 16n for the requested page, then the central directory server program 22 accesses (at block 132) the requested page from one cache server 2a, 2b . . . 2n identified in the cache server ID field 52a . . . 52n in one tuple of information in the entry 50 for the requested page. Because no cache server 2a, 2b . . . 2n maintains data units with updated data, the page can be accessed from any cache 8a, 8b . . . 8n identified in the entry 50. The central directory server program 22 generates (at block 134) a tuple of information to add to the entry 50 for the requested page, where the generated tuple of information identifies the requesting cache server 2a, 2b . . . 2n in field 52a . . . 52n and includes an update word 54a . . . 54n and invalidation word 56a . . . 56n with all the data unit bits 54a . . . 54n and 56a . . . 56n set "off". The retrieved page and generated tuple of information are returned (at block 136) to the requesting cache server 136. Note that in alternative implementations, instead of sending the tuple of information, only the generated update word 54a . . . 54n may be sent.

If (at block 130) one update word 54a . . . 54n in one tuple of information for another cache server 2a, 2b . . . 2n in the entry 50 for the requested page does have one data unit bit set "on", then the central directory server program 22 determines (at block 138) the tuple of information in the entry 50 for the requested page whose update word 54a . . . 54n has the most data unit bits set "on". The central directory server program 22 then retrieves (at block 140) the requested page from the cache server 2a, 2b . . . 2n identified in field 52a . . . 52n of the determined tuple of information, the tuple of info having the greatest number of most recent data unit values. For each other tuple in the entry 50 for the page having an update word 54a . . . 54n with data unit bits set "on", the central directory server program 22 would access (at block 142) the corresponding data units corresponding to the bits set "on" from the cache server 2a, 2b . . . 2n identified in field 52a . . . 52n of the tuple and add the accessed data to the corresponding data units in the retrieved page. A tuple for the entry for the retrieved page is generated (at block 144) for the requesting cache server 2a, 2b . . . 2n identifying in field 52a . . . 52n the requesting cache server and including an update word 54a . . . 54n and invalidation word 56a . . . 56n with all data unit bits set "off". Control then proceeds to block 136 to return the retrieved page and generated tuple (or relevant parts thereof) to the requesting cache server 2a, 2b . . . 2n.

With the logic of FIGS. 3 and 4, a client browser page request is first serviced from the local cache 8a, 8b . . . n and then a remote cache if there is no copy in the local cache. If there is no copy of the requested page in a local cache or remote cache, then the page is downloaded from over the Internet 6. Because the latency access times are greatest for downloading over the Internet, access performance is optimized by downloading preferably from the local cache, then remote cache, and then finally the Internet. Further, in certain implementations, when receiving a page for the first time stored in remote caches, the returned page includes the most recent values from the data units as maintained in all remote caches.

FIG. 5 illustrates logic implemented in the cache server programs 24a, 24b . . . 24n to handle a request by a client browser 20a, 20b . . . 20g to modify a data unit, referred to as the target data unit in one page, referred to as the target page. Control begins at block 200 with the cache server program 24a, 24b . . . 24n receiving a request to modify a data unit in a page from one client 18a, 18b . . . 18g that is assigned to transmit page requests to the cache server 2a, 2b . . . 2n receiving the request. If (at block 202) the data unit bit in the update word in the local cache directory 28a . . . 28n for the requested page corresponding to the target data unit is set to "on", indicating that the cache server 2a, 2b . . . 2n receiving the request, referred to as the receiving cache server, has the most up-to-date value for the target data unit 12a, 12b . . . 12n, 14a, 14b . . . 14n, 16a, 16b . . . 16 n, then the receiving cache server program 24a, 24b . . . 24n updates (at block 204) the data unit in the target page in the cache 8a, 8b . . . 8bn coupled to the receiving cache server 2a, 2b . . . 2n with the received modified data unit. Otherwise, if the update word 54a . . . 54n 28a, 28b . . . 28n at the receiving cache server 2a, 2b . . . 2n does not have the bit corresponding to the target data unit set to "on", then the receiving cache server program 24a, 24b . . . 24n sends (at block 202) a request to modify the target data unit in the target page to the central server 4.

FIG. 6 illustrates operations performed by the central directory server program 22 in response to a request from the receiving cache server 2a, 2b . . . 2n (at block 206 in FIG. 5) to modify the target data unit in the target page. In response to receiving such a request (at block 210), the central directory server program 22 determines (at block 214) whether the data unit bit corresponding to the target data unit in the invalidation word 56a . . . 56 in the tuple for the receiving cache server 2a, 2b . . . 2n (indicated in field 52a . . . 52n) in the entry 50 for the requested page is set to "on", indicating "invalid". If so, then another cache server 2a, 2b . . . 2n has modified the target data unit. In such case, the central directory server program 22 determines (at block 216) the tuple in the entry for the other cache server 2a, 2b . . . 2n having an update word 56 with the target data unit bit 56 (FIG. 2) set to "on", i.e., the entry for the cache server that has the most recent data for the subject data unit. The central directory server program 22 then retrieves (at block 218) the most recent value of the target data unit from the other cache server 2a, 2b . . . 2n indicated in the determined tuple and returns (at block 220) the retrieved most recent data unit value to the receiving cache server. In the determined tuple, the target data unit bit in the update word 54a . . . 54n for the other cache server 2a, 2b . . . 2n is set (at block 222) to "off" because after the update operation, the receiving cache server will update the target data unit and have the most recent value for the target data unit.

After providing the receiving cache server with the most recent data value (from block 222) or if the receiving cache server does have the most recent value for the target data unit (from the no branch of block 214), control proceeds to block 224 and 226 where the central directory server program 22 sets (at block 224) in the entry for the requesting cache server, the data unit bits corresponding to the target data unit in the update word 54a . . . 54n to "on" and the bits in the invalidation word 56a . . . 56n in the entry for the requesting cache server to "off". The central directory server program 22 also sets (at block 226) the data unit bit in the invalidation words 56a . . . 56n in the tuples in the entry 50 for the target page for all other cache servers to "on", indicating that the other cache servers have invalid data for the target data unit in their copy of the target page. The central directory server program 22 then returns (at block 228) a message to the receiving cache server to proceed with modifying the target data unit. The message may also include a message, explicit or implicit, to the requesting cache server to update the relevant bits in their validation and invalidation words for the received page to indicate that the requesting cache server has the most recent update for the data units being updated in the page. In alternative implementations, the central directory server program 22 may return the modified validation and invalidation words.

Upon receiving (at block 250 in FIG. 5) the modified target data unit from the central directory server program 22, the cache server program 24*a*, 24*b* . . . 24*n* updates (at block 252) the target data unit in the target page in its cache 8*a*, 8*b* . . . 8*n* with the received modified data unit. Upon receiving (at block 254) the message to modify the target data unit, the requesting cache server 24*a*, 24*b* . . . 24*n* adds (at block 256) the modified data unit received from the client browser 20*a*, 20*b* . . . 20*g* to the page 10*a*, 10*b* . . . 10*n* in the cache 8*a*, 8*b* . . . 8*n*.

The described implementations provide a protocol for a distributed cache server system to allow updates to be made at one cache server by a client browser and at the same time maintain data consistency between all cache servers. This also provides a relaxed data update consistency because if the data is updated in a browser, only an invalidated data bit is set in the central directory for the remote cache servers that have a copy of the page including the data unit being modified. No information about updates is contained in the remote cache servers and browsers at the remote cache servers and clients may continue to read pages from local caches that do not have the most recent data unit values. However, if a browser receiving data from a cache server that does not have the most recent data attempts to modify a data unit, then the browser will receive the most recent data before applying the modification.

Additional Implementation Details

The described techniques for managing a distributed cache server system may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In described implementations, both an invalidation word and update word is maintained for each tuple of information in each entry in the central server. In alternative implementations, only the update word is maintained. In such implementations, to determine whether the requesting cache server has stale data, the central server would have to process the update words in tuples for the other cache servers to determine if any of the other cache servers have modified the data unit.

In the described implementations, the pages maintained in cache comprised memory pages, where multiple memory pages would store the data for a single web page accessed from a URL over the Internet. Alternatively, the memory pages in cache may comprise web pages.

In described implementations, a central server and central directory server program managed update operations to make sure that the requesting cache server received the most recent data before applying an update. In alternative implementations, the operations described as performed by the central server and central directory server program may be distributed among the cache servers to provide a distributed central directory. In such implementations where the operations performed by the central directory server program are distributed, information maintained in the update words and invalidation words at the central server would be distributed to the cache servers to allow the cache servers to perform distributed cache management operations.

In described implementations, each cache server maintained a copy of the update word for each page maintained in the cache 8*a*, 8*b* . . . 8*n* for the cache server 2*a*, 2*b* . . . 2*n*. Alternatively, the cache servers may not maintain an update word and instead handle all consistency operations through the central server.

The information described as included in the update and invalidation words may be implemented in any one or more data structures known in the art to provide the update and invalidation information. For instance, the update and invalidation information may be implemented in one or more data objects, data records in a database, entries in a table, separate objects, etc.

The pages maintained in the caches may comprise any data object type, including any type of multimedia object in which a client or user can enter or add data to modify the content of the object.

In the described implementations, there is a separate cache server coupled to each cache. The cache and cache server may be in the same enclosed unit or may be in separate units. In alternative implementations, one cache server may be coupled to multiple caches and maintain update information for the multiple coupled caches.

In described implementations, the central server downloaded pages from over the Internet. Alternatively, the central server may download pages from any network, such as an Intranet, Local Area Network (LAN), Wide Area Network (WAN), Storage Area Network (SAN), etc. Further, the cache servers may directly access the Internet to download pages.

The illustrated logic of FIGS. 3–6 shows certain events occurring in a certain order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

Figure 7:
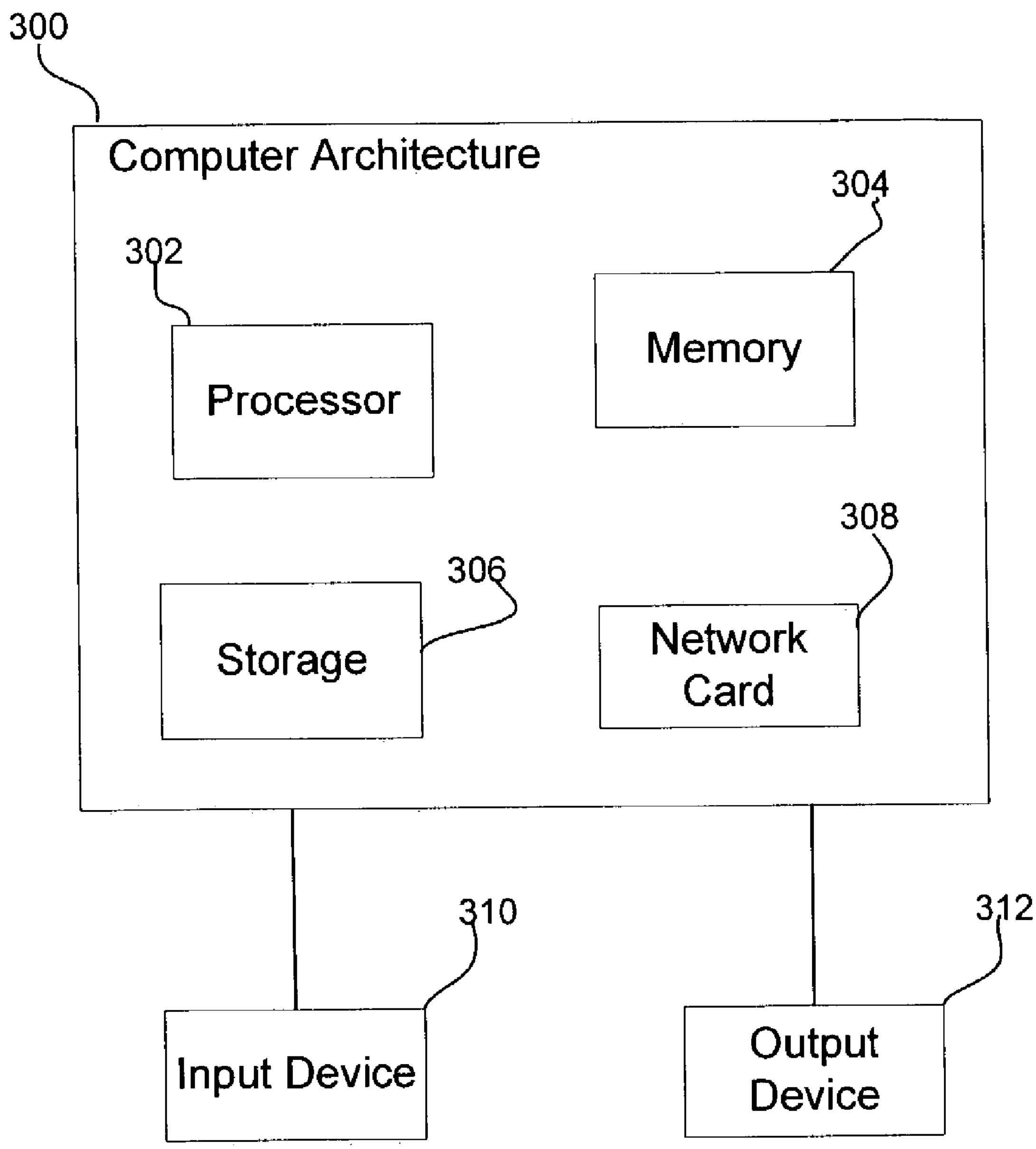
FIG. 7 illustrates an architecture of computing components in the network environment, such as the cache servers and central servers, and any other computing devices.

FIG. 7 illustrates one implementation of a computer architecture 300 of the network components, such as the central server and cache servers shown in FIG. 1. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs in the storage 306 are loaded into the memory 304 and executed by the processor 302 in a manner known in the art. The architecture further includes a network card 308 to enable communication with a network. An input device 310 is used to provide user input to the processor 302, and may include a keyboard, mouse, pen-stylus, microphone, touch sensitive display screen, or any other activation or input mechanism known in the art. An output device 312 is capable of rendering information transmitted from the processor 302, or other component, such as a display monitor, printer, storage, etc.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for maintaining data in distributed caches, comprising:

maintaining a copy of an object in at least one cache, wherein multiple caches may have different versions of the object, and wherein each of the objects is capable of having a plurality of modifiable data units;

maintaining update information for each object maintained in each cache, wherein the update information for each object in each cache indicates the object, the cache including the object, and indicates whether each data unit in the object was modified; and after receiving a modification to a target data unit in one target object in one target cache, updating the update information for the target object and target cache to indicate that the target data unit is modified, wherein the update information for the target object in any other cache indicates that the target data unit is not modified.

2. The method of claim 1, further performing after receiving the request to modify the data unit:

if the update information for the target object and target cache indicate that the target data unit is modified, then applying the received modification to the data unit in the target object in the target cache.

3. The method of claim 1, further performing after receiving the modification:

if the update information for the target object and target cache indicate that the target data unit is not modified, then determining whether another cache includes the target object and a most recent target data unit value;

if another cache does not include the most recent target data unit value, then applying the modification to the data unit in the target object in the target cache; and updating the update information for the target object and target cache to indicate that the target data unit is modified, wherein the update information for the target object in any other cache indicates that the data unit is not modified.

4. The method of claim 1, further performing after receiving the modification:

if the update information for the target object and target cache indicate that the target data unit is not modified, then determining whether another cache includes the target object and a most recent target data unit value; and if another cache includes the most recent target data unit value, then retrieving the most recent target data unit value from the determined cache and updating the target object in the target cache with the retrieved most recent target data unit value.

5. The method of claim 4, further comprising:

after updating the target object in the target cache with the most recent target data unit value, applying the received modification to the data unit in the target object in the target cache; and updating the update information for the target object and target cache to indicate that the target data unit is modified, wherein the update information for the target object in any other cache indicates that the data unit is not modified.

6. The method of claim 4, wherein a central server performs the steps of determining whether another cache includes the target object and the most recent target data unit value and retrieving the most recent target data unit value from the other cache, further comprising:

returning, with the central server, the most recent target data unit value, wherein the modification to the target data unit is applied to the target cache after the most recent target data unit value is applied to the target cache.

7. The method of claim 6, wherein one cache server is coupled to each cache, and wherein each cache server maintains update information for each object in the at least one cache to which the cache server is coupled, and wherein the central server maintains update information for each object in each cache.

8. The method of claim 1, further comprising:

maintaining invalidation information for each object in each cache, wherein the invalidation information for one object in one cache indicates whether each data unit in the object is valid or invalid.

9. The method of claim 8, further comprising:

if the invalidation information for the target object and target cache indicate that the target data unit is invalid, then determining from the update information the cache that includes a most recent target data unit value for the target object; and retrieving the most recent target data unit value from the determined cache and updating the target object in the target cache with the most recent target data unit value.

10. The method of claim 9, further comprising:

after updating the target object in the target cache with the most recent target data unit value, applying the received modification to the target data unit in the target object in the target cache;

updating the update information for the target object and target cache to indicate that the target data unit is modified; and updating the invalidation information for each cache that includes the target object to indicate that the target data unit is invalid.

11. The method of claim 10, further comprising:

updating the update information for the target object in the determined cache to indicate that the data unit is not modified.

12. The method of claim 9, wherein a central server performs the steps of determining whether the invalidation information for the target object and target cache indicates that the target data unit is invalid, determining the cache that includes the target object and the most recent target data unit value, and retrieving the most recent target data unit value from the determined cache, further comprising:

returning, by the central server, the most recent target data unit value, wherein the modification to the target data unit is applied to the target cache after the most recent target data unit value is applied to the target object in the target cache.

13. The method of claim 12, wherein one cache server is coupled to each cache, and wherein each cache server maintains update information for each object in the at least one cache to which the cache server is coupled, and wherein the central server maintains update information and invalidation information for each object in each cache, further comprising:

determining, by a target cache server that received the modification to the target data unit, whether the update information for the target object and target cache indicate that the target data unit is modified; and updating, by the target cache server, the data unit in the target object in the target cache after determining that the update information for the target object and target cache indicate that the target data unit is modified.

14. The method of claim 13, further comprising:

sending, by the target cache server, a request to the central server to modify the target data unit; and returning, by the central server, a message to the target cache server to proceed with the modification that (I) does not include the most recent target data unit value if no other cache had the most recent target data unit value or (2) includes the most recent target data unit value if another cache had the most recent target data unit value; and applying, by the target cache server, the received most recent target data unit value to the target page in the target cache before applying the received modification to the target data unit value.

15. A system for maintaining data, comprising:

a plurality of caches;

means for maintaining a copy of an object in at least one cache, wherein the caches may have different versions of the object, and wherein each of the objects is capable of having a plurality of modifiable data units;

means for maintaining update information for each object maintained in each cache, wherein the update information for each object in each cache indicates the object, the cache including the object, and indicates whether each data unit in the object was modified; and means for updating the update information for the target object and target cache to indicate that the target data unit is modified after receiving a modification to a target data unit in one target object in one target cache, wherein the update information for the target object in any other cache indicates that the target data unit is not modified.

16. The system of claim 15, further comprising:

means for applying the received modification to the data unit in the target object in the target cache after receiving the request to modify the data unit and if the update information for the target object and target cache indicate that the target data unit is modified.

17. The system of claim 15, further comprising means for performing after receiving the modification:

determining whether another cache includes the target object and a most recent target data unit value if the update information for the target object and target cache indicate that the target data unit is not modified;

applying the modification to the data unit in the target object in the target cache if another cache does not include the most recent target data unit value; and updating the update information for the target object and target cache to indicate that the target data unit is modified, wherein the update information for the target object in any other cache indicates that the data unit is not modified.

18. The system of claim 15, further comprising means for performing after receiving the modification:

determining whether another cache includes the target object and a most recent target data unit value if the update information for the target object and target cache indicate that the target data unit is not modified; and retrieving the most recent target data unit value from the determined cache and updating the target object in the target cache with the retrieved most recent target data unit value if another cache includes the most recent target data unit value.

19. The system of claim 18, further comprising:

means for maintaining invalidation information for each object in each cache, wherein the invalidation information for one object in one cache indicates whether each data unit in the object is valid or invalid.

20. The system of claim 19, further comprising:

means for determining from the update information the cache that includes a most recent target data unit value for the target object if the invalidation information for the target object and target cache indicate that the target data unit is invalid; and means for retrieving the most recent target data unit value from the determined cache and updating the target object in the target cache with the most recent target data unit value.

21. The system of claim 20, wherein a central server implements the means for determining whether the invalidation information for the target object and target cache indicates that the target data unit is invalid, determining the cache that includes the target object and the most recent target data unit value, and retrieving the most recent target data unit value from the determined cache, further comprising:

means for returning, performed by the central server, the most recent target data unit value, wherein the modification to the target data unit is applied to the target cache after the most recent target data unit value is applied to the target object in the target cache.

22. A computer readable medium for maintaining data in distributed caches, wherein the computer readable medium causes operations to be performed, the operations comprising:

maintaining a copy of an object in at least one cache, wherein multiple caches may have different versions of the object, and wherein each of the objects is capable of having a plurality of modifiable data units;

maintaining update information for each object maintained in each cache, wherein the update information for each object in each cache indicates the object, the cache including the object, and indicates whether each data unit in the object was modified; and after receiving a modification to a target data unit in one target object in one target cache, updating the update information for the target object and target cache to indicate that the target data unit is modified, wherein the update information for the target object in any other cache indicates that the target data unit is not modified.

23. The computer readable medium of claim 22, further performing after receiving the request to modify the data unit:

if the update information for the target object and target cache indicate that the target data unit is modified, then applying the received modification to the data unit in the target object in the target cache.

24. The computer readable medium of claim 22, further performing after receiving the modification:

if the update information for the target object and target cache indicate that the target data unit is not modified, then determining whether another cache includes the target object and a most recent target data unit value;

if another cache does not include the most recent target data unit value, then applying the modification to the data unit in the target object in the target cache; and updating the update information for the target object and target cache to indicate that the target data unit is modified, wherein the update information for the target object in any other cache indicates that the data unit is not modified.

25. The computer readable medium of claim 22, further performing after receiving the modification:

if the update information for the target object and target cache indicate that the target data unit is not modified, then determining whether another cache includes the target object and a most recent target data unit value; and if another cache includes the most recent target data unit value, then retrieving the most recent target data unit value from the determined cache and updating the target object in the target cache with the retrieved most recent target data unit value.

26. The computer readable medium of claim 25, further comprising:

after updating the target object in the target cache with the most recent target data unit value, applying the received modification to the data unit in the target object in the target cache; and updating the update information for the target object and target cache to indicate that the target data unit is modified, wherein the update information for the target object in any other cache indicates that the data unit is not modified.

27. A computer readable medium of claim 26, wherein a central server performs the steps of determining whether another cache includes the target object and the most recent target data unit value and retrieving the most recent target data unit value from the other cache further comprising:

returning, with the central server, the most recent target data unit value, wherein the modification to the target data unit is applied to the target cache after the most recent target data unit value is applied to the target cache.

28. The computer readable medium of claim 27, wherein one cache server is coupled to each cache, and wherein each cache server maintains update information for each object in the at least one cache to which the cache server is coupled, and wherein the central server maintains update information for each object in each cache.

29. The computer readable medium of claim 22, further comprising:

maintaining invalidation information for each object in each cache, wherein the invalidation information for one object in one cache indicates whether each data unit in the object is valid or invalid.

30. The computer readable medium of claim 29, further comprising:

if the invalidation information for the target object and target cache indicate that the target data unit is invalid, then determining from the update information the cache that includes a most recent target data unit value for the target object; and retrieving the most recent target data unit value from the determined cache and updating the target object in the target cache with the most recent target data unit value.

31. The computer readable medium of claim 30, further comprising:

after updating the target object in the target cache with the most recent target data unit value, applying the received modification to the target data unit in the target object in the target cache;

updating the update information for the target object and target cache to indicate that the target data unit is modified; and updating the invalidation information for each cache that includes the target object to indicate that the target data unit is invalid.

32. The computer readable medium of claim 31, further comprising:

updating the update information for the target object in the determined cache to indicate that the data unit is not modified.

33. The computer readable medium of claim 30, wherein a central server performs the steps of determining whether the invalidation information for the target object and target cache indicates that the target data unit is invalid, determining the cache that includes the target object and the most recent target data unit value, and retrieving the most recent target data unit value from the determined cache, further comprising:

returning, by the central server, the most recent target data unit value, wherein the modification to the target data unit is applied to the target cache after the most recent target data unit value is applied to the target object in the target cache.

34. The computer readable medium of claim 33, wherein one cache server is coupled to each cache, and wherein each cache server maintains update information for each object in the at least one cache to which the cache server is coupled, and wherein the central server maintains update information and invalidation information for each object in each cache, further comprising:

determining, by a target cache server that received the modification to the target data unit, whether the update information for the target object and target cache indicate that the target data unit is modified; and updating, by the target cache server, the data unit in the target object in the target cache after determining that the update information for the target object and target cache indicate that the target data unit is modified.

35. The computer readable medium of claim 34, further comprising:

sending, by the target cache server, a request to the central server to modify the target data unit; and returning, by the central server, a message to the target cache server to proceed with the modification that (I) does not include the most recent target data unit value if no other cache had the most recent target data unit value or (2) includes the most recent target data unit value if another cache had the most recent target data unit value; and applying, by the target cache server, the received most recent target data unit value to the target page in the target cache before applying the received modification to the target data unit value.

* * * * *